(12) United States Patent
Kikuchi

(10) Patent No.: US 6,179,080 B1
(45) Date of Patent: Jan. 30, 2001

(54) RADAR OUTPUT CONTROL SYSTEM

(75) Inventor: Hayato Kikuchi, Wako (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/150,731

(22) Filed: Sep. 10, 1998

(30) Foreign Application Priority Data

Sep. 12, 1997 (JP) .................................................. 9-249056

(51) Int. Cl.$^7$ .................................................. G08G 1/16
(52) U.S. Cl. .......................... 180/169; 342/70; 701/96; 340/903
(58) Field of Search .................................. 180/167, 168, 180/169; 340/902, 903; 342/70, 71, 72; 701/96, 300, 301

(56) References Cited

U.S. PATENT DOCUMENTS

| | | | |
|---|---|---|---|
| 5,068,795 | * 11/1991 | Kamimura et al. | 180/167 X |
| 5,247,296 | * 9/1993 | Spies | 180/167 X |
| 5,321,407 | * 6/1994 | Kikuchi et al. | 342/70 |
| 5,396,426 | * 3/1995 | Hibino et al. | 180/169 X |
| 5,428,359 | * 6/1995 | Yoneyama et al. | 342/70 |
| 5,574,644 | * 11/1996 | Butsuen et al. | 180/169 X |
| 5,604,580 | * 2/1997 | Uehara | 180/169 |
| 5,670,953 | * 9/1997 | Satoh et al. | 180/169 X |
| 5,677,695 | * 10/1997 | Suzuki et al. | 342/70 X |
| 5,696,515 | * 12/1997 | Zyren et al. | 342/70 X |
| 5,699,040 | * 12/1997 | Matsuda | 342/70 |
| 5,710,565 | * 1/1998 | Shirai et al. | 342/70 |
| 5,745,050 | * 4/1998 | Nakagawa | 180/167 X |
| 5,760,884 | * 6/1998 | Yahashi et al. | 180/167 X |
| 5,769,051 | * 6/1998 | Bayron et al. | 180/167 X |
| 5,771,007 | * 6/1998 | Arai et al. | 180/169 X |
| 5,806,019 | * 9/1998 | Ishiyama | 342/70 X |
| 5,808,561 | * 9/1998 | Kinoshita et al. | 180/167 X |
| 5,826,216 | * 10/1998 | Lyons et al. | 342/70 X |
| 5,861,836 | * 1/1999 | Hoss | 342/70 |
| 5,913,375 | * 6/1999 | Nishikawa | 180/167 X |
| 5,929,785 | * 7/1999 | Satonaka | 180/167 X |
| 5,961,559 | * 10/1999 | Shimbara et al. | 180/168 X |

* cited by examiner

Primary Examiner—Michael Mar
(74) Attorney, Agent, or Firm—Arent Fox Kintner Plotkin & Kahn, PLLC

(57) ABSTRACT

A radar output control system to ensure that the output from a radar device is prohibited when a vehicle is stopped or traveling at a low speed, to thereby prevent a laser beam from entering human eyes. A control system for controlling the output from a radar device which transmits a laser beam for detecting an object ahead of the vehicle in a traveling direction, permits the transmission of the laser beam, when both of a driven wheel speed detected by a driven wheel speed detecting device and a follower wheel speed detected by a follower wheel speed detecting device are equal to or greater than reference values. Thus, when the vehicle is mounted on a chassis dynamo device, and driven wheels are rotated, while follower wheels are stopped, the transmission of the laser beam can be reliably prohibited, because the follower wheel speed is lower than the reference value, even if the driven wheel speed is equal to or greater than the reference value.

4 Claims, 3 Drawing Sheets

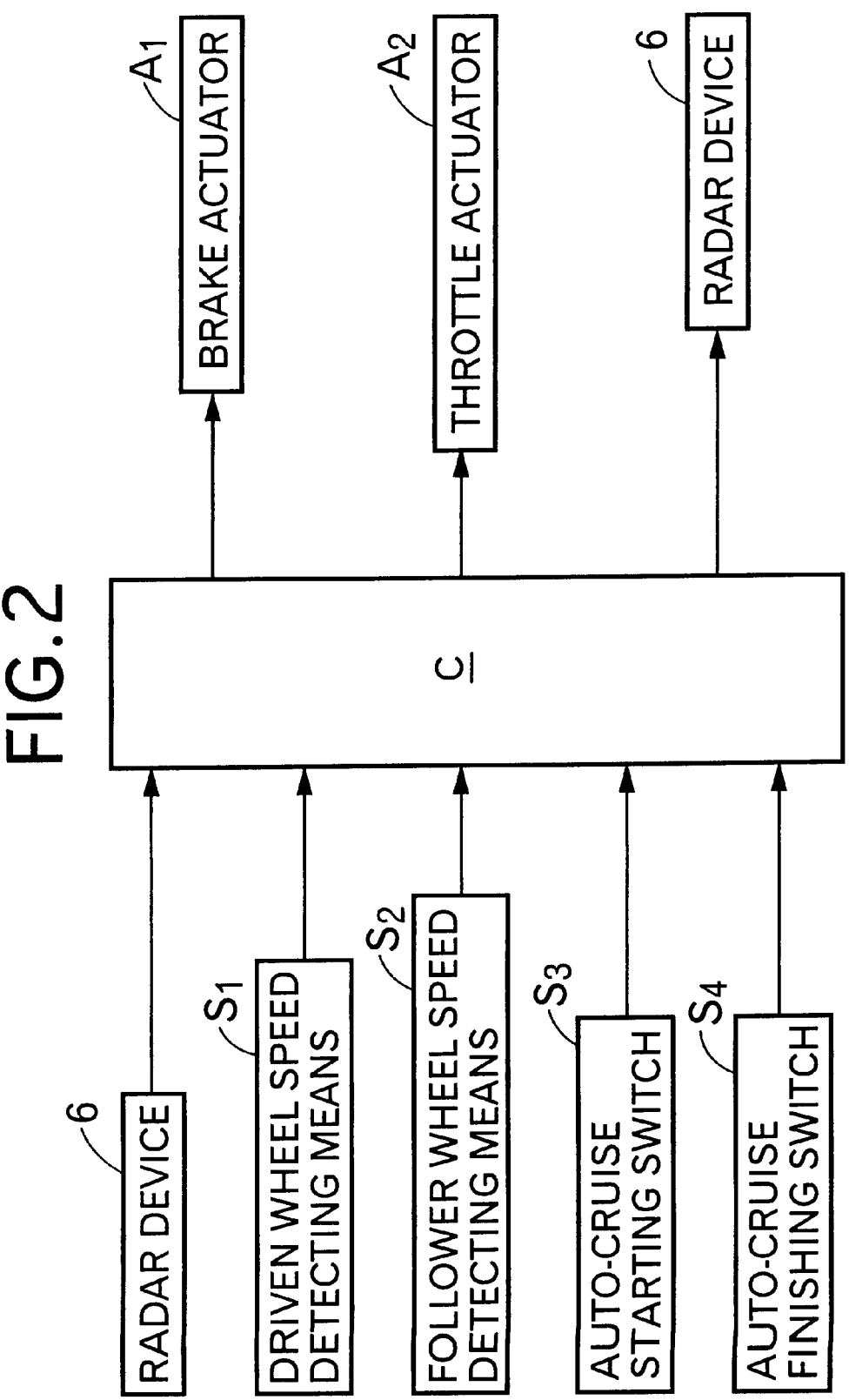

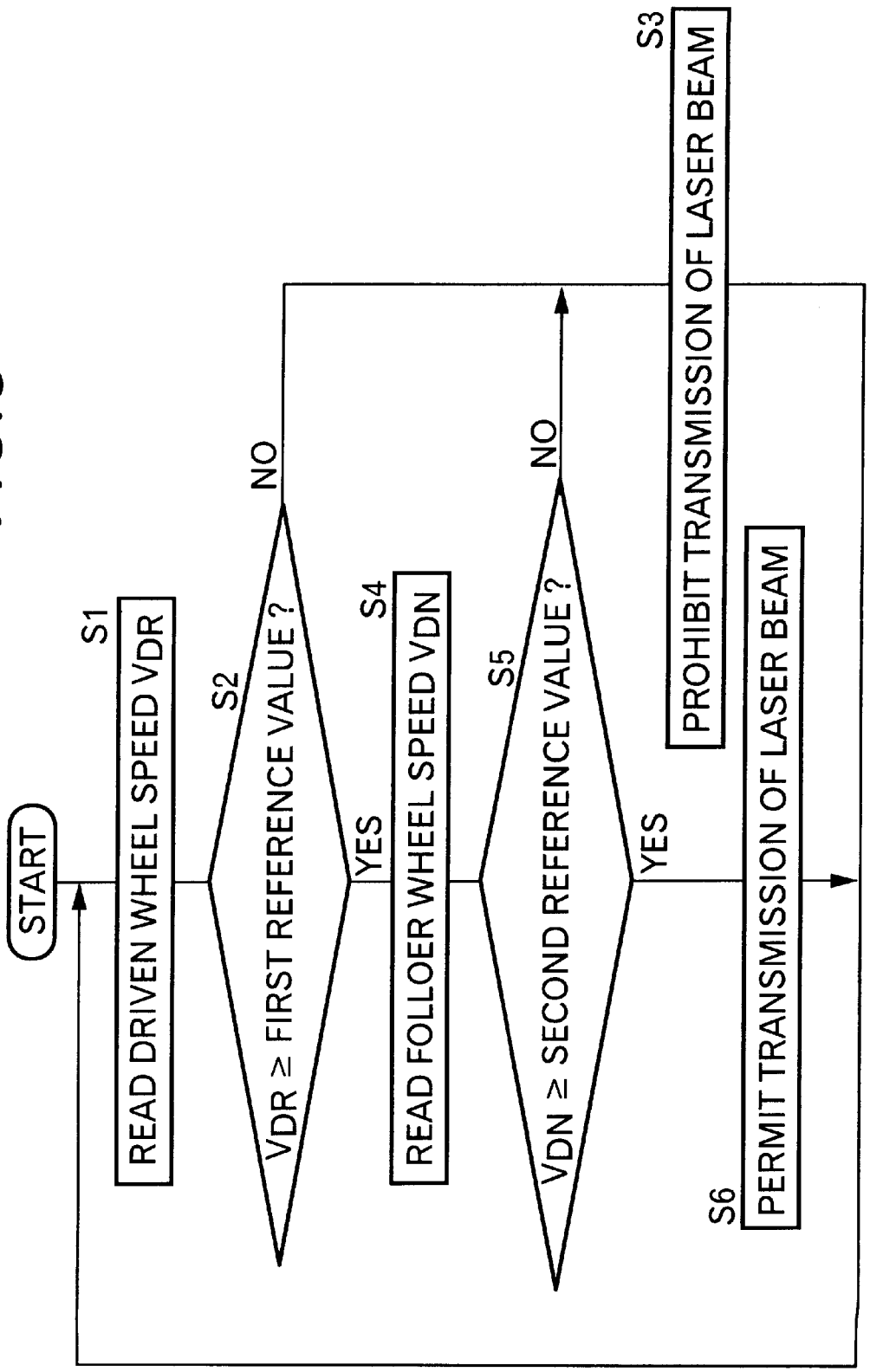

RADAR OUTPUT CONTROL SYSTEM

BACKGROUND OF THE INVENTION

1. Field of the Invention

The present invention relates to a radar output control system including a control means for controlling the output from a radar device for detecting an object ahead of a vehicle in the traveling direction of the vehicle.

2. Description of the Prior Art

There is a conventionally well-known auto-cruising system adapted to allow a vehicle to travel following a target vehicle traveling ahead of the vehicle, by detecting a relative distance between the vehicle and the target vehicle using a radar device having a laser beam. The speed of the vehicle is controlled, so that the relative distance is maintained at a predetermined value. Such an auto-cruising system is known from Japanese Patent Application Laid-open No. 62-259111, which is designed, so that the eyes of a pedestrian or the like are prevented from being exposed to the laser beam by reducing the output from the radar device during stoppage of the vehicle or during traveling of the vehicle at a low speed.

In general, the vehicle speed is detected based on the rotational speed of a rotating member of the vehicle transmission, differential or the like. However, when the vehicle is mounted on a chassis dynamo device, and the driven wheels are rotated, there is a possibility that it may be misinterpreted that the vehicle is traveling, whereby the output from the radar device is permitted, because a higher vehicle speed is detected due to the rotation of the driven wheels, notwithstanding that the vehicle is actually stationary on the chassis dynamo device.

SUMMARY OF THE INVENTION

The present invention has been accomplished with the above circumstance in view, and it is an object of the present invention to provide a radar output control system, wherein the output from the radar device can be reliably prohibited when the vehicle is stopped or during traveling of the vehicle at low speeds.

To achieve the above object, there is provided a radar output control system comprising a control means for controlling the output of a radar device for detecting an object ahead of a vehicle in the traveling direction of the vehicle, wherein the control means controls the output from the radar device based on the driven wheel speed detected by a driven wheel speed detecting means and a follower wheel speed detected by a follower wheel speed detecting means.

With the above arrangement, the output from the radar device is controlled based on the driven wheel speed and the follower wheel speed. Therefore, it can be reliably determined whether the vehicle is actually traveling or is stopped, thereby properly controlling the output from the radar device.

When the driven wheel speed detected by the driven wheel speed detecting means is equal to or greater than a first reference value, and the follower wheel speed detected by the follower wheel speed detecting means is lower than a second reference value, the control means prohibits an output from the radar device.

With the above arrangement, for example, when the vehicle is mounted on a chassis dynamo device and the driven wheels are rotated, while the follower wheels are stopped, the output from the radar device can be reliably prohibited, because the follower wheel speed is lower than the second reference value, even if the driven wheel speed is equal to or greater than the first reference value.

The prohibition of the output of the radar device also includes a reduction in the output to a level at which the influence on a human's eyes is acceptable. The first and second reference values are set at 35 km/hr in the embodiment described below, but is not limited to 35 km/hr and may be any speed (e.g., 10 km/hr or more) at which the radar device provides substantially no influence on human eyes. Further, the first and second reference values are not necessarily equal to each other.

When the driven wheel speed detected by the driven wheel speed detecting means, is equal to or greater than the first reference value, and the follower wheel speed detected by the follower wheel speed detecting means is equal to or greater than the second reference value, the control means permits the output from the radar device.

With the above arrangement, only when the driven wheel speed is equal to or greater than the first reference value and the follower wheel speed is equal to or greater than the second reference value, thereby ensuring that the vehicle is reliably in a traveling state, the output from the radar device is permitted. Therefore, it is possible to reliably prevent an output from the radar device when the vehicle is stopped or is traveling at a low speed.

The permitting of the output from the radar device refers to the permitting of an output at a level at which there may be an influence on human eyes.

BRIEF DESCRIPTION OF THE DRAWINGS

The mode for carrying out the present invention will now be described by way of an embodiment shown in the accompanying drawings.

FIG. 2 is a block diagram of a control system of the present invention.

FIG. 3 is a flow chart for explaining the operation of the present invention.

DETAILED DESCRIPTION OF THE PREFERRED EMBODIMENT

Figure 1:
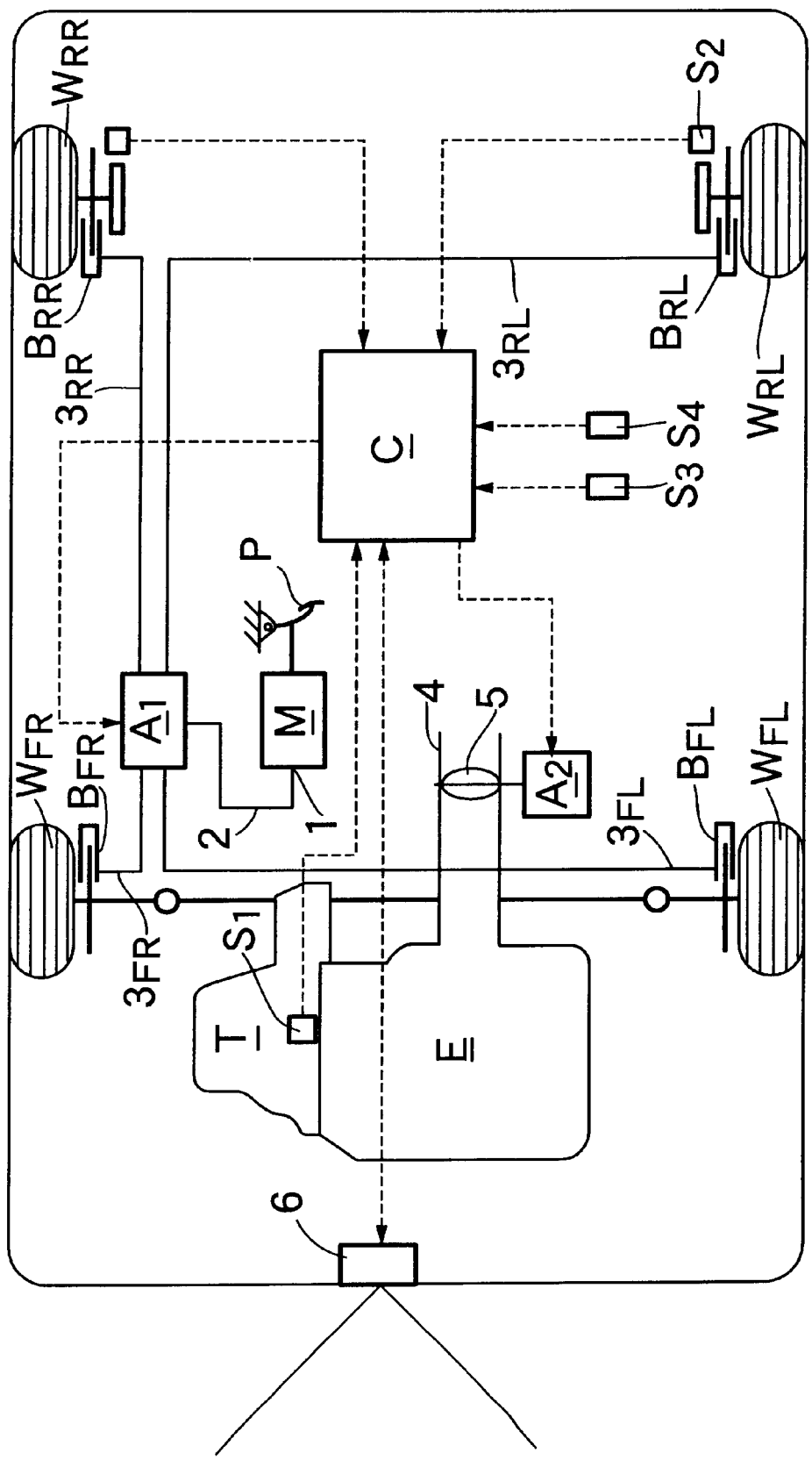
FIG. 1 is an illustration of the entire arrangement of a vehicle including an auto-cruising device of the present invention.

As shown in FIG. 1, a left front wheel disk brake $B_{FL}$ and a right front wheel disk brake $B_{FR}$ are mounted respectively on a left front wheel $W_{FL}$ and a right front wheel $W_{FR}$, which are the driven wheels of a front wheel drive vehicle. A left rear wheel disk brake $B_{RL}$ and a right rear wheel disk brake $B_{RR}$ are mounted respectively on a left rear wheel $W_{RL}$ and a right rear wheel $W_{RR}$, which are the follower wheels.

A brake actuator $A_1$ is mounted between an oil passage 2 connected to an output port 1 of a master cylinder M for generating a braking hydraulic pressure corresponding to the operation of a brake pedal P, and oil passages $3_{FL}$, $3_{FR}$, $3_{RL}$ and $3_{RR}$ are individually connected to the disk brakes $B_{FL}$, $B_{FR}$, $B_{RL}$ and $B_{RR}$. The brake actuator $A_1$ is capable of being switched between a state in which the oil passage 2 and the oil passages $3_{FL}$, $3_{FR}$, $3_{RL}$ and $3_{RR}$ are put into communication with each other during non-operation of the brake actuator $A_1$ to apply the braking hydraulic pressure from the master cylinder, to each of the disk brakes $B_{FL}$, $B_{FR}$, $B_{RL}$ and $B_{RR}$, and a state in which the oil passage 2 and the oil passages $3_{FL}$, $3_{FR}$, $3_{RL}$ and $3_{RR}$ are not in communication with each other during operation of the brake actuator $A_1$.

A throttle actuator $A_2$ is connected to a throttle valve 5 mounted in an intake passage 4 of an engine E, so that the opening degree of the throttle valve 5, namely, the engine output is controlled by the operation of the throttle actuator $A_2$.

A radar device 6 is mounted at a front portion of the vehicle and comprises a laser radar which is capable of transmitting a laser beam forwards from the vehicle and receiving a laser beam reflected from a vehicle traveling ahead of the vehicle (which will be referred to as a preceding vehicle hereinafter) and which is capable of calculating the distance from the vehicle to the preceding vehicle based on the time lag from the transmission of the laser beam to the reception of the reflected laser beam. The radar device 6 is capable of detecting the distance from the vehicle to the preceding vehicle by scanning the laser beam in the direction of the width of the vehicle.

As can be seen by reference to FIG. 2 in addition to FIG. 1, an electronic control unit C receives a signal from the radar device 6, a signal from a driven wheel speed detecting means $S_1$ for detecting a driven wheel speed $V_{DR}$ based on the number of rotation of an output shaft of a transmission T connected to the engine E, a signal from follower wheel speed detecting means $S_2$, for detecting follower wheel speeds based on the number of rotation of the left and right rear wheels $W_{RL}$ and $W_{RR}$ which are the follower wheels, a signal from an auto-cruise starting switch $S_3$, and a signal from an auto-cruise termination switch $S_4$.

The electronic control unit C controls the operation of the brake actuator $A_1$ and the throttle actuator $A_2$ to accelerate or decelerate the vehicle, so that when the auto-cruise starting switch $S_3$ is operated to start the auto-cruise control, the relative distance between the vehicle and the preceding vehicle detected by the radar device 6 is maintained at a predetermined distance. The auto-cruise is terminated when the auto-cruise finishing switch $S_4$ is operated, when an accelerator pedal (not shown) is depressed, or when the brake pedal P is depressed. When the radar device 6 transmits an intensive laser beam while the vehicle is stopped or traveling at a low speed, there is a possibility that the intensive laser beam may enter the eyes of a pedestrian or the like. For this reason, when it is detected based on the driven wheel speed $V_{DR}$ and the follower wheel speed $V_{DN}$ that the vehicle is stopped or is traveling at a low speed, the electronic control unit C prohibits the transmission of the laser beam.

The control of the transmission of the laser beam by the radar device 6 and the stopping of the transmission of the laser beam will be described in detail below with reference to the flow chart in FIG. 3.

First, at Step S1, the driven wheel speed $V_{DR}$ detected by the driven wheel speed detecting means $S_1$ is read. If the driven wheel speed $V_{DR}$ is not equal to or greater than a first reference value (e.g., 35 km/hr) at Step S2, it is determined that there is a possibility that a laser beam transmitted from the radar device 6 may enter the eyes of a pedestrian or the like. At Step S3, the transmission of the laser beam is therefore prohibited.

When the driven wheel speed $V_{DR}$ is equal to or greater than the first reference value at Step S2, the processing is shifted to Step S4, at which the follower wheel speed $V_{DN}$ detected by the follower wheel speed detecting means $S_2$ is read. If the follower wheel speed $V_{DN}$ is not equal to or greater than a second reference value (e.g., 35 km/hr) at subsequent Step S5, the processing is shifted to Step S3, where the transmission of the laser beam is prohibited. What Steps S4 and S5 mean is as follows. Suppose that Steps S4 and S5 do not exist. In this case, when the vehicle is mounted on chassis dynamo device, and an actual traveling state of the vehicle is simulated while rotating the front wheels $W_{FL}$ and $W_{FR}$ which are driven wheels, a driven wheel speed $V_{DR}$ equal to or greater than the first reference value is detected, because the front wheels $W_{FL}$ and $W_{FR}$ which are driven wheels are being rotated, notwithstanding that the vehicle is held on the chassis dynamo device in a stopped state. As a result, the answer at Step S2 is YES, and the transmission of the laser beam is permitted at Step S6, whereby it is a possibility that the laser beam may enter the eyes of an operator operating the chassis dynamo device.

However, unless the follower wheel speed $V_{DN}$ becomes equal to or greater than the second reference value, the transmission of the laser beam is prohibited by the provision of Steps S4 and S5. Therefore, the laser beam is reliably prevented from being transmitted in a state in which the vehicle is mounted on a chassis dynamo device i.e., in a state in which the follower wheel speed $V_{DN}$ is zero.

As described above, only when the driven wheel speed $V_{DR}$ is equal to or greater than the first reference value and the follower wheel speed $V_{DN}$ is equal to or greater than the second reference value, is the transmission of the laser beam permitted. Therefore, it is possible to reliably prevent the laser beam from being transmitted when vehicle is stopped or during the traveling of the vehicle at a low speed.

The radar device 6 in the embodiment is used in the auto-cruising system for the vehicle, but may be utilized in other applications such as a collision avoiding system for a vehicle and the like. The driven wheel speed detecting means $S_1$ is not limited to detecting the driven wheel speed $V_{DR}$ based on the number of rotation of the output shaft of the transmission T, and may be a means for detecting a driven wheel speed $V_{DR}$ based on the number of rotation of a final driven gear of a differential or directly detecting the number of rotation of the driven wheels.

As discussed above, according to the present invention, the output from the radar device is controlled based on the driven wheel speed and the follower wheel speed. Therefore, it can be precisely determined whether the vehicle is actually traveling or is stopped, thereby properly controlling the output from the radar device.

When the vehicle is mounted on a chassis dynamo device, and the driven wheels are rotated, while the follower wheels are stopped, the output from the radar device can be reliably prohibited, because the follower wheel speed is lower than the second reference value, even if the driven wheel speed become equal to or greater than the first reference value.

Only when the driven wheel speed is equal to or greater than the first reference value, and the follower wheel speed is equal to or greater than the second reference value, thereby ensuring that the vehicle is reliably in a traveling state, does the radar device permit an output. Therefore, it is possible to reliably prevent the output from the radar device from being permitted, when the vehicle is in a stopped state or traveling at a low speed.

Although the embodiment of the present invention has been described in detail, it will be understood that the present invention is not limited to the above-described embodiment, and various modifications may be made without departing from the subject matter of the invention.

What is claimed is:

1. A control system for a vehicle radar device for detecting an object ahead of the vehicle, the vehicle having driven wheels and follower wheels, said control system comprising:

driven wheel speed detecting means for detecting a rotational speed of the driven wheels of the vehicle;

follower wheel speed detecting means for detecting a rotational speed of the follower wheels of the vehicle;

vehicle stop determining means for determining that the vehicle is stopped, based on the driven wheel speed detected by said driven wheel speed detecting means and the follower wheel speed detected by said follower wheel speed detecting means and for generating an output indicative of the vehicle being stopped when the detected wheel speed of the follower wheels is substantially zero and the detected wheel speed of the driven wheels is equal to or greater than zero; and control means for controlling an output of the radar device based on the output of said vehicle stop determining means, said control means prohibiting an output from the radar device in response to an output from the vehicle stop determining means indicative of the vehicle being stopped.

2. A radar output control system according to claim 1, wherein when the driven wheel speed detected by the driven wheel speed detecting means, is equal to or greater than a first reference value, and the follower wheel speed detected by the follower wheel speed detecting means, is lower than a second reference value, the control means prohibits an output from the radar device.

3. A radar output control system according to claim 1, wherein when the driven wheel speed detected by the driven wheel speed detecting means is equal to or greater than a first reference value, and the follower wheel speed detected by the follower wheel speed detecting means, is equal to or greater than a second reference value, the control means permits an output from the radar device.

4. A radar output control system according to claim 1, wherein the radar device is a laser radar device.

* * * * *